Sept. 16, 1958  E. S. MARVIN  2,851,923
STRIP FILM FEEDING MECHANISM
Filed Aug. 13, 1953  3 Sheets-Sheet 1

EDGAR S MARVIN
INVENTOR.
BY
ATTORNEYS

Sept. 16, 1958     E. S. MARVIN     2,851,923
STRIP FILM FEEDING MECHANISM
Filed Aug. 13, 1953     3 Sheets—Sheet 2
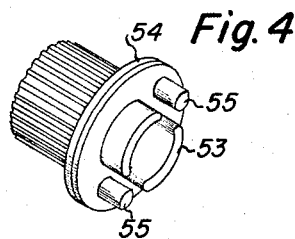
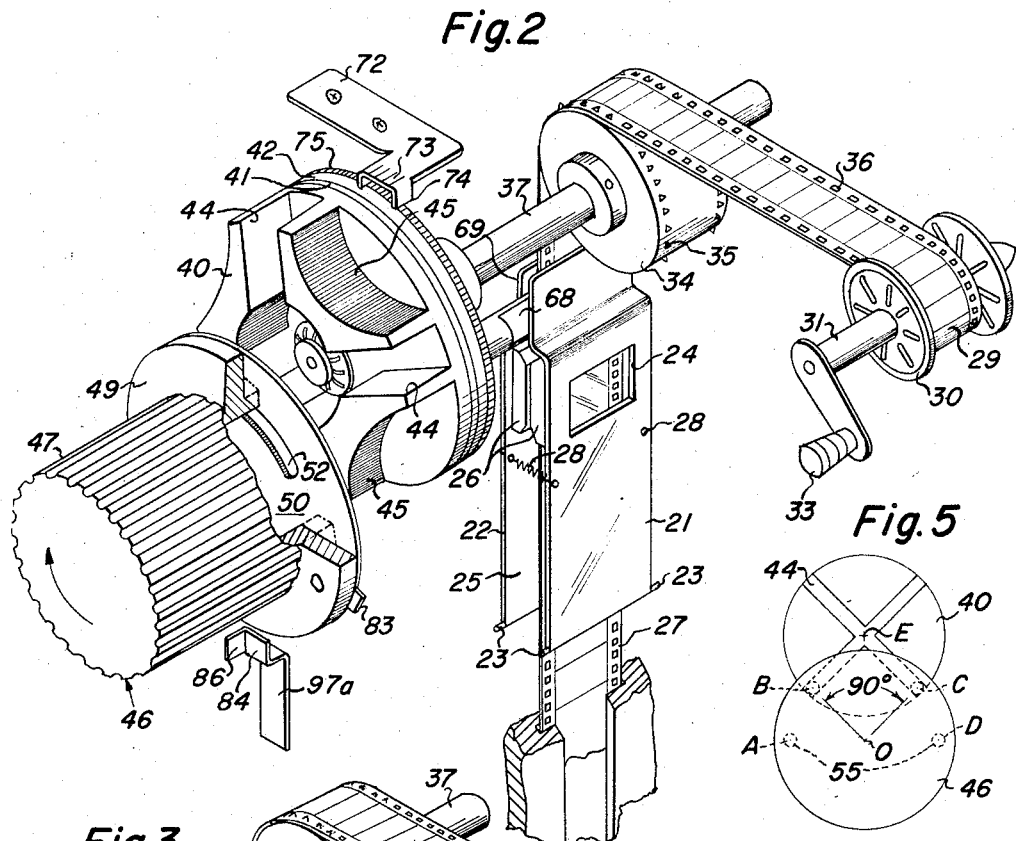
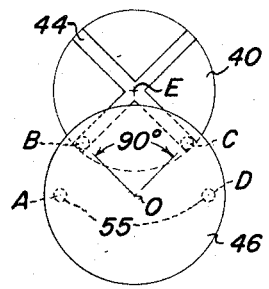
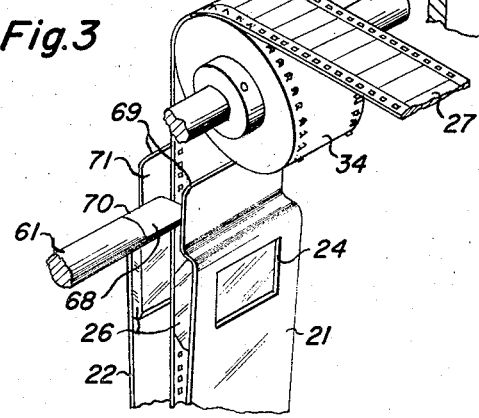
EDGAR S. MARVIN
INVENTOR.
BY
ATTORNEYS

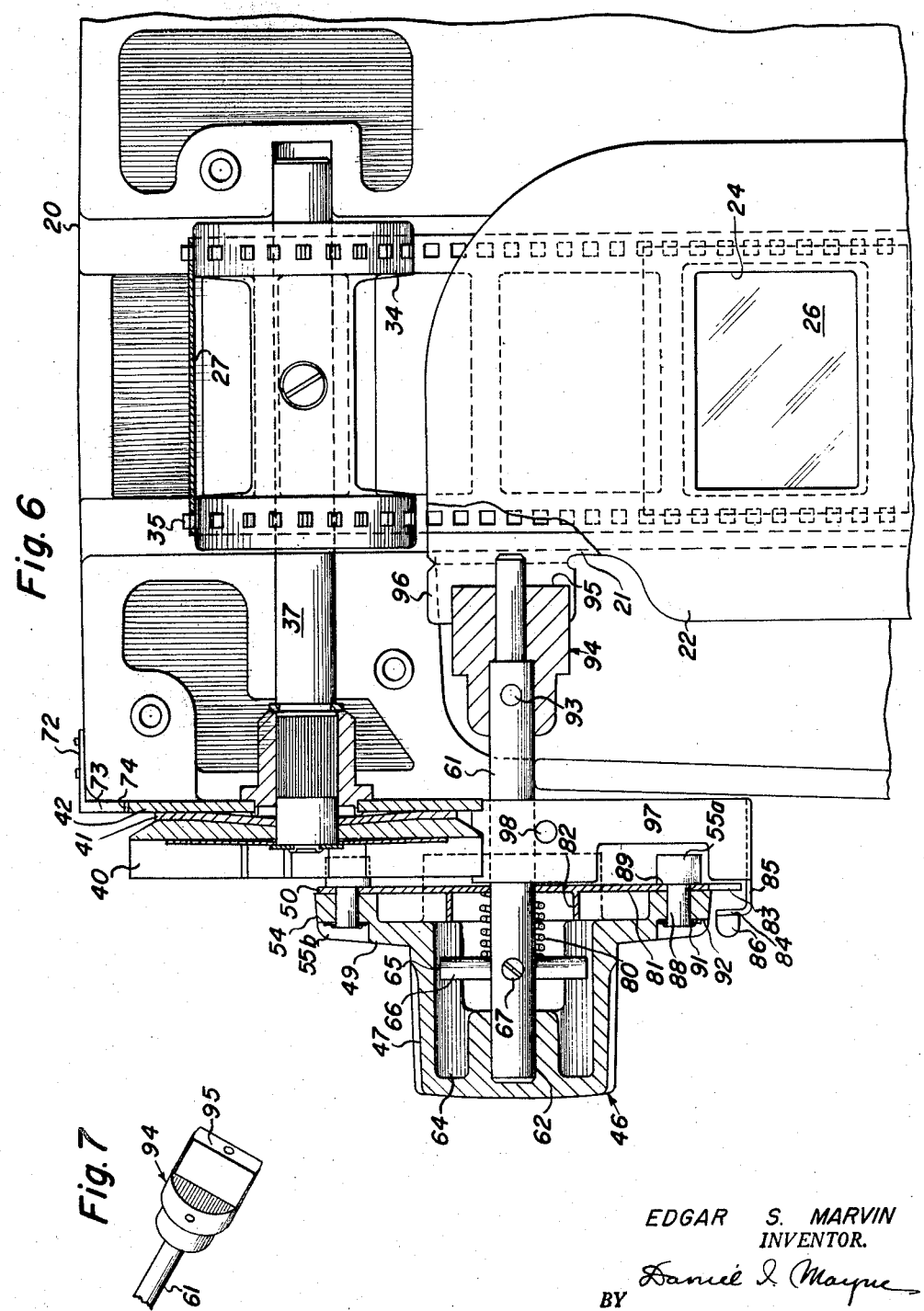

United States Patent Office 2,851,923
Patented Sept. 16, 1958

2,851,923

STRIP FILM FEEDING MECHANISM

Edgar S. Marvin, Rochester, N. Y., assignor to Eastman Kodak Company, Rochester, N. Y., a corporation of New Jersey Application August 13, 1953, Serial No. 374,071

8 Claims. (Cl. 88—28)

The present invention relates to photography, and more particularly to a feeding and framing device for a strip film projector.

The initial framing is accomplished by imparting sufficient movement, either forward or backward, to the film feeding sprocket to position the first image area of a film strip in registry with the viewing aperture of the projector. Thereafter, all subsequent image areas are automatically and positively framed in the film gate. Prior to the film feeding, the film gate is opened so as to permit the free and unobstructed movement of the film through the gate to prevent damage thereto. After the film has been brought into proper registry in the film gate, the latter is closed to clamp and hold the image area in a plane during projection. When all the image areas have been projected, the gate is moved to open position, and the drive means is disconnected so that the film strip may be quickly and easily wound back through the gate and rewound onto the supply spool.

These results are secured by driving the film feeding sprocket by means of a Geneva gear movement to be later more fully described. The first part of the operating cycle of the movement serves to open the gate, while the intermediate portion of the cycle connects the drive member to the film sprocket to move the film strip through the gate to bring the film into positive registry with the gate aperture. After the film has been properly positioned in the film gate, the final portion of the cycle serves to close the gate and clamp the film in a plane for projection. In order to insure proper framing of successive film areas, the first area is accurately framed in the gate by adjusting the drive means, either forward or backward, until the image area is brought into proper registry with the aperture in the film gate. After this initial image area has thus been properly positioned and framed in the film gate, the film sprocket is locked against further movement, and the parts of the Geneva movement are separately actuated both to synchronize the parts with the framed area and also to close the film gate to clamp the film, all as will be later described. By thus synchronizing the Geneva movement with the framed image area, each subsequent operation of the Geneva movement will serve to move and frame an image area automatically in the film gate. After the complete strip has been projected, one of the members of the Geneva movement is shifted to a retracted position to disconnect the movement or at least the driving member therefor from the film sprocket. The retracted member is then adjusted to open the gate to permit free movement of the film therethrough during the winding operation.

The present invention has as one of its objects, a novel form of image framing mechanism.

Still another object of the invention is the provision of means for synchronizing the sprocket drive means and the operating mechanism therefor with the framed image area.

Yet another object of the invention is the provision of a novel arrangement for holding the drive member of the Geneva movement in a retracted and gate opening position to permit free and unobstructed winding of the film strip.

Yet another object of the invention is the provision of a novel arrangement for holding the drive member of the Geneva movement in a retracted and gate opening position to permit free and unobstructed winding of the film strip.

And another object of the invention is the provision of a mechanism of the type described, which is simple in structure, comprises few parts of rugged construction, accurate in its operation, and highly effective in use.

To these and other ends the invention resides in certain improvements and combinations of parts, all as will be hereinafter more fully described, the novel features being pointed out in the claims at the end of the specification.

In the drawings:

Fig. 2 is a perspective view of the film feeding and positioning mechanism of the present invention in a simple form, showing the relation of the various parts, the film gate being in the closed position to clamp and position the image area in the gate for projection.

Fig. 3 is a partial perspective view of the mechanism illustrated in Fig. 2 showing the film gate in open position to permit the free and easy forward or reverse feeding of the film strip through the gate;

Fig. 4 is a perspective view of a pin or drive wheel of a Geneva gear movement constructed in accordance with the present invention;

Fig. 5 is a diagrammatic view of the Geneva movement of the present invention showing the relation of the parts at different portions of the cycle;

Fig. 6 is a front elevation view, with parts in section, showing a preferred, modified film feeding and positioning arrangement constructed in accordance with the present invention; and Fig. 7 is a partial view of the mechanism illustrated in Fig. 6, showing the specific means utilized for moving the film gate of Fig. 6 to open position.

Similar reference numerals throughout the various views indicate the same parts.

Figure 1:
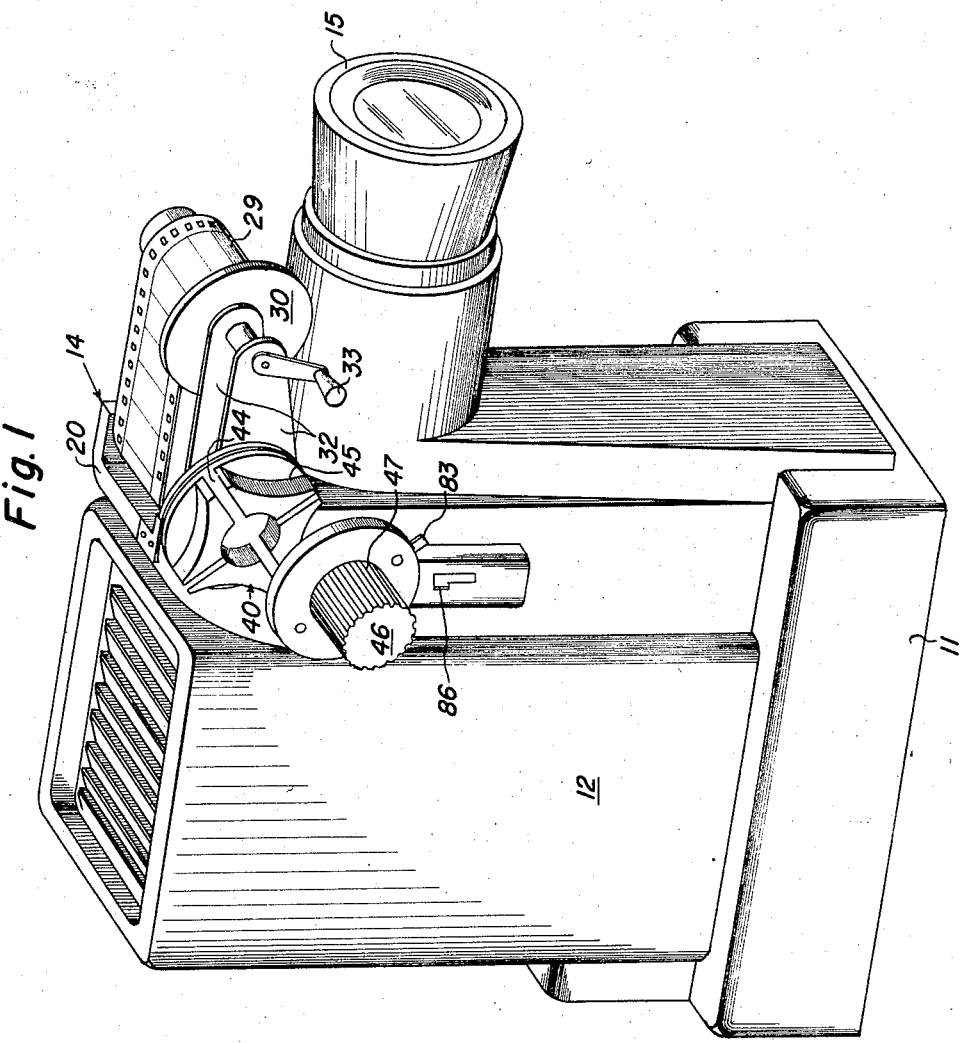
Fig. 1 is a view of one form of a film strip projector, showing the relation thereto of a film feeding and positioning mechanism constructed in accordance with the present invention.

Fig. 1 of the drawings shows, by way of illustration only, one form of a projector adapted for use with strip film feeding and projecting mechanism of the present invention. The projector comprises, broadly, a base 11 and housing 12 extending upwardly from the base and enclosing the projection lamp and the various condenser lenses, not shown. The housing 12 supports the film feeding and positioning mechanism of the present invention, broadly indicated by the numeral 14, Fig. 1. Extending forwardly of the mechanism 14, the housing 12 has mounted thereon a projection lens 15 which is arranged in optical alignment with the projection lamp and the condenser lenses, and which carries the projection lenses, not shown. As the projector, per se, may be of any suitable design and forms no part of the present invention, further details thereof are not deemed necessary to fully and completely understand the present invention. Suffice it to say that the projector is adapted to project image areas formed on a film strip, and successively to bring the areas into projecting position in alignment with the optical members of the projector. The entire mechanism of the present invention may be mounted on a suitable frame, plate or supporting member, generally indicated by the numeral 20, Figs. 1 and 6, which may be suitably positioned on the projector or otherwise mounted in proper relation to the optical elements of the projector.

The mechanism of the present invention comprises a film gate, which, in the embodiment illustrated in Figs. 2 and 3, comprises a pair of axially spaced plate members 21 and 22, which are pivotally mounted at 23 at their lower ends on the frame 20. The gate members are formed with axially aligned projection and framing apertures which are adapted to be positioned in alignment with the optical members of the projector, only one of these apertures is shown at 24, Figs. 2 and 3. The inner surfaces 25 of the members 21 and 22 have positioned thereon and overlying the apertures 24, glass plates 26 which serve to clamp the film strip 27 in a flat or planar relation during projection, as is deemed apparent from an inspection of Fig. 2. Springs 28 are connected to the gate members 21 and 22 and tend to move the members to gate closing or film clamping relation, as is deemed apparent from an inspection of Fig. 2. As is common practice, the gate is open during the time the film is being moved through the gate, as shown in Fig. 3, but during the projection period the gate is closed, as shown in Fig. 2.

The film strip 27 is provided with a plurality of successive picture areas and is arranged in the form of a roll 29, positioned on a spool or reel 30. The latter is suitably supported on a shaft 31 mounted for rotation in a pair of spaced parallel members or brackets 32 which extend forwardly from the supporting frame 20, see Fig. 1. The shaft 31 is preferably provided with a suitable handle 33 by which the shaft 31 and the spool 30 may be rotated to rewind the film strip 27 back onto the spool 30 after projection, as will be readily apparent to those in the art.

The film strip 27 is drawn off the reel or spool 30 and is passed over a driven sprocket 34 formed with rows of teeth 35 which engage in the marginal perforations 36 of the film strip 27 to propel the latter through the film gate to position accurately and automatically the successive image areas of the strip in registry or framing relation with the gate apertures 24, the purpose of which is deemed apparent. The sprocket 34 is mounted on a shaft 37 for rotation as a unit therewith when the shaft is driven by drive means to be later described. It is apparent from an inspection of Fig. 2 that if the shaft 37 is rotated in a counterclockwise direction, the sprocket 34 will draw the film strip 27 off the spool 30 and will feed the strip downward through the film gate to bring the image area into registry with the gate apertures 24 so that the image area may be projected onto a suitable viewing screen, not shown.

For the most effective operation, the shaft 37 should be rotated an amount sufficient to move the film strip exactly the distance of one image area only so that each actuation of the shaft will move the film strip an amount sufficient to bring the next image area into accurate and positive registration with the apertures of the film gate. Such movement may, of course, be controlled by the operator watching the projected image on the screen and continuing such rotation until the image area has been properly positioned or framed in the gate aperture. Such a method for positioning and/or framing the successive image areas in the gate is highly undesirable, for obvious reasons. In order to overcome this undesirable feature, the present invention provides a drive means for the shaft 37 which is so designed that each actuation of the drive means rotates a sprocket 34 an amount exactly equal to the spacing of the image areas so as to move the film strip exactly the distance between image areas so as to bring an image area into the gate and into exact registration with the gate apertures. Also, the driving means controls a gate opening mechanism which is operated in timed relation to the film movement so the gate is opened prior to the movement of the film strip therethrough so as to prevent injury to the film. After the image area has been brought into registration with the gate apertures, the drive means is utilized to close the gate to clamp the positioned or framed image area in a plane for projection.

To secure this result, the present invention provides a two-pin, four-slot Geneva gear system or movement which is operatively connected, in a manner to be later described, to the shaft 37. The arrangement is such that a 180° rotation of the drive member of the Geneva movement imparts a 90° rotation to the driven member of the movement and hence a 90° rotation to shaft 37 and sprocket 34. The first 45° rotation of the drive member is utilized to open the film gate, the next 90° movement serves to connect the drive member to the driven member of the movement, and hence to sprocket 34, to move or advance the film strip the distance of one image area through the film gate at which time the drive member is then automatically and completely disconnected from the driven member. Then the last 45° rotation of the drive member is utilized to close the film gate to clamp the image area. Thus, each 180° rotation of the drive member of the Geneva system constitutes a complete feeding and positioning cycle, as well as a gate opening and closing operation. After the film has been passed through the gate, it may be fed out of a slot, not shown, in the bottom of the projector, or it may be coiled up in a suitable compartment, not shown, in the bottom of the projector housing 12.

The Geneva system or movement comprises in the present embodiment, a driven member or star wheel 40 which is loosely mounted on the left end of shaft 37, as viewed in Figs. 2 and 6. The wheel 40 is connected through a friction member or disc 41 carried by shaft 37 to a disc or plate 42 on fixed shaft 37, all of which is clearly illustrated in Figs. 2 and 6. It will thus be apparent from an inspection of Figs. 2 and 6 that if the star wheel 40 is rotated counterclockwise, as viewed in Fig. 2, such rotation will be transmitted through the friction member 41 to rotate plate 42, shaft 37, and sprocket 34, as a unit, to feed the film strip 27 from the spool 30 through the film gate. The member 41 thus constitutes a friction clutch between the star wheel 40 and the plate 42, the purpose of which arrangement will be later more fully described. The left face of the star wheel 40 is formed with four radially extending slots 44 spaced 90° apart, as clearly shown in Figs. 1 and 2. Between the slots 44, the surface or periphery of the wheel 40 is formed with concave arcuate portions 45.

Intermittent motion is imparted to the star wheel 40, and hence to shaft 37 and sprocket 34, by means of a drive member in the form of a pin wheel or knob 46 formed with a cylindrical portion 47 the periphery of which is roughened or slotted so as to provide a good gripping surface which may be grasped by the operator to impart rotation to the knob 46. As will be deemed apparent to those familiar with the Geneva movement, in order to impart a counterclockwise rotation to the star wheel 40 and sprocket 37, the pin wheel 46 must be rotated clockwise as indicated by an arrow in Fig. 2. The right end of knob 46 as viewed in Fig. 2, or the end toward the star wheel 40, terminates in a radially extending flange 49 of a larger diameter than the portion 47. A face plate 50 overlies and is secured, in any suitable manner, to the right face of the flange 49. The plate 50 is formed with a pair of arcuate shaped slots 52, through which similarly shaped lugs or bosses 53 extend. These bosses may be formed integral with the flange 49 and project axially from the right face thereof and are spaced radially inward of the periphery 54 of the flange 49. At least the outer surface of each boss 53 has a radius of curvature substantially equal to the curvature of the arcuate portions 45 of the star wheel 40, the purpose of which is deemed apparent but will be later described. The flange 49 is also provided with a pair of diametrically arranged axially extending drive pins 55 which may be formed integral with the flange 49 and which project through registering openings formed in plate 50. The pin wheel drive or knob 46 is so positioned axially that the pins 55 are in the path of and are adapted to move into the slots 44 of the star wheel 40 when the pin wheel is rotated so that upon engagement of the pin in the slots, the star wheel 40 will be rotated in a counterclockwise direction to rotate the sprocket 34 similarly to feed the film strip through the film gate.

The knob 46 is mounted on the left end of a supporting shaft 61 which is suitably positioned and supported for rotation in the frame 20. For reasons to be later discussed, a spline connection is provided between knob 46 and shaft 61 so the knob and shaft may rotate as a unit, but the knob may slide axially relative to the shaft. To secure this result, the interior of the knob is hollow but a bearing 62 is provided in the knob 46 for supporting the latter on the shaft, as shown in Fig. 6. Also, the inner surface of the knob is provided with a pair of axially extending slots 64 adapted to receive opposite ends 65 of a plate or web 66 pinned at 67 to the shaft 61. The slots 64 and the plate 66 thus provide a spline connection between the knob 46 and shaft 61, as is deemed apparent from an inspection of Figs. 2 and 6.

The right end of the shaft 61 is formed with a narrowed or flattened portion 68 which extends between inwardly offset sections 69 which project upwardly from the gate members 21 and 22. The space between the sections 69 is slightly greater than the narrow dimension or thickness of the portion 68, so the latter in no way interferes with the closing of the gate members 21 and 22 when the portion 68 is in the position illustrated in Fig. 2. It will be apparent, however, from an inspection of Fig. 2 that the rotation of the shaft 61 in either direction will cause the outer opposite edges 70 of the portion 68 to engage the inner surfaces 71 of the sections 69. Such engagement will serve to rock the gate members 21 and 22 about their pivots 23 and away from each other to open the gates, as shown in Fig. 3. However, when the shaft is rotated to the position shown in Fig. 2, the portion 68 becomes inoperative, and the springs 28 will serve to move the gate members 21 and 22 toward each other to clamp the positioned image area of the film strip between the glass plates 26 in position for projection. Thus, the gate opening is controlled from shaft 61 which, in turn, is controlled or actuated by the pin wheel or knob 46.

Fig. 5 shows a diagrammatic arrangement of the drive knob or pin wheel 46 and the star wheel 40 with its radial slots 44 which are adapted to receive one of the pins 55 of the pin wheel. The parts are shown in the position which they occupy at the beginning of the cycle with the pins 55 in horizontal alignment. It will be apparent from an inspection of this figure that during the first 45° of clockwise rotation of the knob 46, the left pin 55 does not engage in the left slot 44 of the star wheel 40 so that the initial rotation of the knob imparts no rotation to the star wheel 40 or sprocket 34, so that the film strip is not moved during this initial 45° movement. However, this initial rotation of the knob 46 is utilized to move or rotate shaft 61 to cause the end 68 thereof to move from the position illustrated in Fig. 2 to that illustrated in Fig. 3 to open the gate. Thus, the first 45° of rotation of the knob 46 is utilized to open the gate so the gate will be open before the film strip is moved. However, at the end of this first 45° clockwise rotation, the left pin 55 finally enters the adjacent slot 44 of the star wheel 40. As the pin wheel continues to rotate, a 90° rotation or turning movement is imparted to the star wheel, as indicated in Fig. 5. This movement of the star wheel is transmitted through the clutch member 41, plate 12 and shaft 37 to rotate the sprocket 34 to move the film strip through the film gate. Thus, after the gate is opened, the pin wheel becomes connected to the star wheel to move the film strip through the open gate. This 90° rotation of the sprocket 34 is just sufficient to move the film strip the distance between adjacent image areas to bring the next image area into accurate and positive registration with the aperture 24 of the gate. After the film area has been properly positioned in the gate, the drive pin 55 of the pin wheel 46 is disengaged from the slot 44 and movement of the star wheel and the sprocket is arrested. When the pin 55 rides out of the slot 44, the pinwheel 46 is disconnected from the star wheel and may be turned relative thereto. At this time the film gate is still in open position but the film movement has stopped.

Upon such disconnection, the convex outer surface of one of the arcuate bosses 53 is moved into registry with the adjacent concave portion 45 of the star wheel to lock the latter positively against further rotation, as is deemed apparent to those familiar with Geneva gear mechanism. By means of the above described structure, the pin wheel 46 is connected to star wheel 40 when the latter is moved from position 45° to 135° rotation to move the film through the gate, and thus the star wheel and sprocket are brought to rest with the image area accurately positioned in the film gate. In order to close the gate, a final 45° rotation is imparted to the pin wheel 46 to rotate the latter and shaft 61 independently of the star wheel 40 and sprocket 34, returning end 68 of shaft 61 to the position shown in Fig. 2 to free the gate members 21 and 22 which are now moved towards each other under the action of the springs 28 to close the gate to clamp the film and image area. The drive pins now are in horizontal alignment as shown in Fig. 5.

Referring again to Fig. 5, it is seen that if the pin wheel 46 is in the position illustrated, and that if the pin wheel is rotated clockwise, no motion will be transmitted to the star wheel 40 until the left pin 55 is traveling from point A to point B. At point B, however, the pin 55 engages a slot 44 of the star wheel 40 to impart a 90° rotation therebetween to move the star wheel from point B to point C. As mentioned above, this 90° rotation is sufficient to move the film strip one image area. At point C the pin 55 moves out of slot 44, and as the pin moves from point C to point D, the pin wheel moves independently of the star wheel to close the film gate. Thus, each complete cycle of the gate opening, film moving, and gate closing, occurs during the 180° rotation of the pin wheel 46. This 180° rotation is split up into an initial 45° for the gate opening, 90° for film movement, and the final 45° for the gate closing.

It will also be noted from Fig. 5 that the angle B—O—C, the angle during which the pin 55 engages slot 44 to move the film, is exactly 90°. This partciular arrangement is of importance in the accurate operation of the device. It will be apparent from an inspection of Fig. 5, that at point B, where pin 55 first engages slot 44, the star wheel 40 has "zero" velocity. However, as the drive pin 55 moves from point A to point E on the vertical axis, the star wheel velocity gradually increases, reaching am aximum at point E. Then, as the pin 55 moves from point E to point C, a gradual decreasing velocity is imparted to the star wheel, said velocity decreasing to "zero" at point C where the star wheel and sprocket come to rest. This 90° driving angle of the star wheel eliminates any flywheel effect on the part of the star wheel. For example, if the operator should inadvertently impart a quick spinning movement to the wheel 46, no harmful effect would result. This is due to the decreasing velocity of the star wheel 40 between points E and C. During this period, the pin wheel would apply a gradual braking force on the star wheel so the latter would come to a full stop or rest at point C irrespective of the manner of rotation of the pin wheel 46. Therefore, under all conditions the star wheel will have imparted thereto 90° and only 90° rotation, so as to move the film strip exactly the distance of one image area when the pin wheel is rotated 180°.

In order that each actuation of the Geneva movement will shift the film strip exactly the distance of one image area, and also accurately and automatically position or frame successive areas in the gate, the parts must be properly designed and synchronized. The proper film movement can be secured by making the sprocket 34 of such size that the above-described 90° rotation will shift the film strip the exact distance between adjacent image areas. The synchronization of the parts may be secured in a number of ways, but preferably is secured when the first image area is moved into framed relation in the gate. To this end, the pin wheel knob 46 is rotated to impart rotation to the star wheel and the sprocket to bring the first image area into the film gate. Exact registration is secured by rotating the knob either backward or forward, as is necessary, until finally an accurate registration of the first area is secured in the gate aperture.

When the first image area is thus framed, the drive pin 55 of the pin wheel 46 will be positioned somewhere between points B and C, Fig. 5, so that the Geneva movement will not be properly synchronized with the framed film area. To secure such synchronization it is necessary to bring the Geneva movement back to the starting point of the cycle but without moving the film strip so as to disturb the framed relation of the positioned image area in the gate. In order to secure this synchronization, a brake is applied to the plate 42 to hold the latter, and hence shaft 37 and sprocket 34, against rotation while at the same time returning the Geneva movement to the starting point A of the cycle, as shown in Fig. 5. This effect may be secured, for example, by means of an L-shaped cantilever brake member or shoe, one arm 72 of which may be secured to the frame member 20 by screws or other fastening means. The free end 73 of the brake shoe is provided with a bifurcated end 74 which is movable manually down into friction engagement with the roughened or milled periphery 75 of the plate 42. This brake shoe is merely illustrative of one means for braking the plate 42. Obviously, other braking means may be provided and will readily suggest themselves to any mechanic. All that is necessary is to provide some means to hold the plate 42, and hence shaft 37 and sprocket 34 against rotation.

With these members thus locked against rotation, the knob 46 is rotated to bring the engaged pin 55 either to positions A or D depending upon which is closer. It will be noted that at this time knob 46 may be rotated in either direction due to the locking of the plate 42.

During this movement, the star wheel 40 will be driven by the pin wheel 46 and will slip relative to the plate 42 by reason of the friction clutch 41, positioned therebetween. When either point B or C is reached by the pin 55, the star wheel 40 will be synchronized with the framed image area. However, the film gate is still open. Further rotation of the pin wheel 46 will move the pin 55 out of slot 44 and the pin wheel will rotate independently of the star wheel to return the pins 55 to positions A and D, Fig. 5. This movement of the pin wheel will also synchronize the latter with the framed image area and will also serve to close the film gate. Thus, the first image area is accurately and positively framed by adjustment of the drive means, after which the film feeding sprocket is locked against rotation, while the drive means are rotated relative thereto to synchronize the drive means with the framed image area. After the first image area has been thus framed, and the parts synchronized, the brake shoe is released, and, due to its resilient nature, will move automatically and completely out of holding relation with plate 42, and the parts will now be returned to their full operative position. In other words, when the first film image area has been properly positioned in the film gate, the feed sprocket 34 is locked and the Geneva movement is slip clutched relative to the plate 42 and sprocket 34 to bring the parts of the movement back to the starting or initial position and in synchronized relation with the first framed image area. From this point on each successive operation of the Geneva movement will move the film strip exactly the distance of one image area and will automatically and positively bring the image area into accurate and precise registration with the apertures in the film gate. Thus, after the first framing operation no further attention is required on the part of the operator to frame successive image areas.

After the last image area has been projected, it is desirable to rewind the film strip back onto spool 30. This may be accomplished by imparting a clockwise rotation to spool 30 by means of handle 33. For obvious reasons, it is desirable to retain the film gate in open position during the entire rewinding operation. Accordingly, the pin wheel 46 is disconnected or declutched from the star wheel 40 by moving it axially to the left, as viewed in Figs. 2 and 6, and by rotating the pin wheel and shaft 61 in a clockwise direction to the position shown in Fig. 3 to open the gate. Means is preferably provided for holding or locking the pin wheel in its retracted or gate opening position. As mentioned above, the pin wheel 46 is splined to shaft 61 by reason of the grooves 64 and plate 66 pinned to shaft 61. By means of this arrangement, the pin wheel 46 may be slid axially to the left, as viewed in Fig. 2. Such movement of the pin wheel 46 will move the drive pins 55 out of the path of the slots 44 of the star wheel 40, so that the latter, and hence sprocket 34, are completely disconnected from pin wheel 46. Such leftward or axial movement of the pin wheel 46 serves to compress a coiled spring 80 positioned loosely on shaft 61 between plate 66 and the inner or left surface of plate 50, as shown in Fig. 6.

The left surface of plate 50 is also formed with an inwardly extending annular flange 82, which is adapted to engage the plate 66 to limit the leftward axial movement of the knob 46. After the knob has been moved to the left sufficiently to retract pins 55 from the path of slots 44, the knob 46 is given an approximate 90° clockwise rotation which will position the flattened end 68 in the relation shown in Fig. 3 to open the gate. This 90° rotation of the pin wheel also serves to bring a radially extending lug 83 formed on plate 50 behind and into engagement with a bent-out lug 84 formed on the support 97a suitably secured to the frame 20, Fig. 2. The lug 84 engages lug 83 to hold the knob 46 in its retracted position to retain the gate in its fully open position during winding. The support 97a is also formed with a second lug 86 arranged normal to lug 84 and positioned in the path of lug 83 to limit the rotation of the pin wheel 90°. After rewinding has been completed, the knob 40 is rotated counterclockwise to disengage lug 83 from holding relation with lug 84. The tensioned spring 80 then moves the pin wheel 46 axially to the right to bring pins 55 into the path of slots 44. Also, the gate closing springs 28 pressing on the ends of portion 68 serve to rock the latter counterclockwise and back to the position illustrated in Fig. 2. The parts of the Geneva movement are now returned to their cooperating relation and the film gate is closed.

Fig. 6 shows a preferred modified arrangement which differs in some minor details from the structure shown in Figs. 2–4 and above described. The parts in Fig. 6 which correspond to those in Figs. 2–4, will be designated by the same numerals. The drive member or pin wheel 46, Fig. 6, may be identical to that of Fig. 2 with the exception of the pins 55a. In this case the pins 55a are of the shape shown in Fig. 6 and extend through registering opening in the flange 49 and plate 50. Each pin has a reduced stem 88 which passes through the registering opening of flange 49 to form a shoulder 89 which engages the front face of the plate 50 to retain the latter in position on flange 49. Thus, this design of the pins 55a eliminates the use of additional holding means for the plate 50. The free end 91 of each stem 88 is peened over the rear surface of flange 49 to secure the pins 55a securely in position.

Also, in the embodiment of Fig. 6, the right end of shaft 61 has pinned at 93 an enlarged collar 94 preferably of non-metallic material, the right or free end 95 of which is reduced in width to provide a narrow portion, see Fig. 7, which is adapted to extend between laterally projecting portions 96 of the gate members 21 and 22. This free end 95 is similar in structure to and operates in the same manner as the flattened end 68 of the shaft 61, Fig. 2, to open the film gate. Furthermore, in Fig. 6 the lugs 84 and 86, which are engaged by lug 83 to hold the pin wheel 46 in retracted position, are preferably formed from a plate 97 which is connected by a pin, rivet, or similar member 94 to the supporting frame 20.

It will be apparent from the above description that the present invention provides a new and improved mechanism for accurately and positively framing both the initial as well as successive image areas of a film strip with relation to the projection aperture of the film gate. Also, the drive mechanism is suitably synchronized with the initial framed image area so that no further attention is required on the part of the operator to insure the proper framing of the subsequent image areas as they are moved into the film gate. Also, during rewinding the drive means is rendered inoperative, and the film gate is held in open position to permit free and unobstructed movement of the film through the film gate.

While certain embodiments of the invention have been disclosed, it is to be understood that the inventive idea may be carried out in a number of ways. This application is, therefore, not to be limited to the precise details described, but is intended to cover all variations and modifications which fall within the scope of the appended claims.

What I claim and desire to secure by Letters Patent of the United States is:

1. In a strip film feeding apparatus, the combination with a film feeding sprocket for successively feeding and framing image areas of a film strip relative to an aperture of an openable film gate, a Geneva movement comprising a slotted star wheel and a pin wheel engageable with and for imparting intermittent rotation to said star wheel, of a disc clutch assembly comprising a plate positioned adjacent and in alignment with said star wheel and a friction member positioned between and connecting said plate and star wheel, means connecting said plate and sprocket so that rotation of said star wheel by said pin wheel will rotate said star wheel, friction member, plate and sprocket as a unit to shift said strip relative to said gate to frame an image area of said strip with the aperture of said gate, means connected to and controlled by said pin wheel and engaging with said gate to open the latter prior to the engagement of said pin wheel with said star wheel so that said gate is opened before said sprocket moves the film, a brake member movable into engagement with said plate to lock the latter and said sprocket when said image area has been framed in said aperture, said friction member permitting independent rotation of said pin and star wheels as a unit relative to said sprocket, whereby during a portion of said independent rotation said star wheel and pin wheel rotate as a unit to synchronize said star wheel with the framed image area and then the pin wheel is disconnected from said star wheel and is rotated separately to move said gate opening means to an inoperative position to free said gate, and spring means connected to said gate to close the latter to clamp the film strip therein with the image area framed in said aperture.

2. In a strip film feeding apparatus, the combination with a film gate comprising a pair of movable members which may be moved toward each other to clamp a film strip or may be moved apart to release said strip, said gate being formed with an aperture with which an image area of the strip may be registered, a film feeding sprocket for moving said strip through said gate, drive means for said sprocket comprising a star wheel and a pin wheel for imparting intermittent movement to said star wheel, of a plate member positioned adjacent said star wheel and connected to said sprocket, a friction clutch element positioned between and frictionally connecting said star wheel to said plate so that normal rotation of said star wheel will rotate said plate and sprocket as a unit therewith to shift said strip through said gate to frame an image area of said strip in said aperture, a supporting shaft for said pinwheel, means for connecting said shaft to said pin wheel so that rotation of said pin wheel will rotate said shaft, means formed on said shaft and positioned between said gate member so that the initial rotation of said pin wheel and shaft will cause the means on said shaft to open said gate member and an intermediate rotation of said pin wheel will connect the latter to said star wheel to rotate the latter and said plate and said sprocket to shift said strip through said gate member to frame an image area in said aperture, a manually controlled brake member movable into engagement with said plate to lock the latter and sprocket against further rotation, said friction member permitting said pin and star wheel to be moved as a unit to synchronize said star wheel with the positioned image and then to rotate said pin wheel relative to the star wheel to rotate said shaft to move said gate opening means to an inoperative position to free said gate, and spring means connected to said gate member to move the freed members toward each other to clamp the framed image area.

3. In a strip film feeding apparatus, the combination with a film sprocket for feeding a film strip through an apertured film gate and to register an image area of said strip with said aperture, an intermittent film movement comprising a rotatable drive member and a rotatable driven member, of means for connecting said driven member to said sprocket so that rotation of said driven member by said drive member will rotate said sprocket to shift the film strip in one direction through said gate, a shaft, means for connecting said drive member on one end of said shaft for rotation as a unit therewith and for relative axial movement, means formed on the other end of said shaft and engaging said gate to open the latter when said drive member is rotated, said drive member being movable axially relative to said shaft to a retracted position and out of operative relation with said driven member and then rotated with said shaft to open said gate, and means to hold said drive member in said retracted position to permit said sprocket to be rotated to shift said film strip in the opposite direction through said gate to rewind said strip.

4. In a strip film feeding apparatus, the combination with a film sprocket for feeding a film strip through an apertured film gate, a Geneva movement comprising a drive member and a driven member, of means for connecting said driven member to said sprocket so that rotation of said driven member by said drive member will rotate said sprocket to shift the film strip in one direction through said gate, a drive shaft, a spline connection for mounting said drive member on one end of said shaft for rotative movement as a unit therewith but axial movement relative thereto, means formed on the other end of said shaft and engaging said gate to open the latter prior to engagement of said drive member with said driven member so that said gate is opened before the film is moved in said one direction by said sprocket, said drive member being shiftable axially on said shaft to a retracted position and away from said driven member to disconnect said members completely, said drive member being then rotatable to rotate said shaft to open said gate, means to hold said drive member in a retracted position, and means independent of said movement for rotating said sprocket to move said strip in a reverse direction through said gate to rewind said strip.

5. In a strip film feeding apparatus, the combination with a film sprocket for feeding a film strip through an apertured film gate, a Geneva movement comprising a drive member and a driven member, of means for connecting said driven member to said sprocket so that rotation of said driven member by said drive member will rotate said sprocket to shift the film strip in one direction through said gate, a drive shaft, a spline connection for mounting said drive member on one end of said shaft for rotative movement as a unit therewith but axial movement relative thereto, means formed on the other end of said shaft and engaging said gate to open the latter prior to engagement of said drive member with said driven member so that said gate is opened before the film is shifted in said one direction by said sprocket, means cooperating with said shaft and drive member normally to retain said drive member in position to engage and rotate said driven member and sprocket when said drive member is rotated, said drive member being movable axially relative to said shaft to a retracted position and out of driving relation with said driven member and then rotated with said shaft to open said gate, means to retain said drive member selectively in said retracted position, and means independent of said Geneva movement for rotating said sprocket to shift said strip in the opposite direction through said gate for rewinding.

6. In a strip film feeding apparatus, the combination with a film sprocket for feeding a film strip through an apertured film gate, a Geneva movement comprising a drive member and a driven member, of means for connecting said driven member to said sprocket, so that rotation of said driven member by said drive member will rotate said sprocket to shift the film strip in one direction through said gate, a drive shaft, a spline connection for mounting said drive member on one end of said shaft for rotative movement as a unit therewith but axial movement relative thereto, means formed on the other end of said shaft and engaging said gate to open the latter prior to engagement of said drive member with said driven member so that said gate is opened before the film is moved in said one direction by said sprocket, means cooperating with said shaft and drive member normally to retain said drive member in position to engage and rotate said driven member and sprocket when said drive member is rotated, said drive member being movable axially relative to said shaft to a retracted position and out of driving relation with said driven member and then rotated with said shaft to cause the means on the other end of said shaft to open said gate, cooperating means in said shaft and drive member for limiting the relative axial movement of said drive member, means to retain said drive member selectively in said retracted position, and means independent of said Geneva movement for rotating said sprocket to shift said strip in the opposite direction through said gate for rewinding.

7. In a strip film feeding apparatus, the combination with a film sprocket for feeding a film strip through an apertured film gate, a Geneva movement comprising a drive member and a driven member, of means for connecting said driven member to said sprocket so that rotation of said driven member by said drive member will rotate said sprocket to shift the film strip in one direction through said gate, a drive shaft, a spline connection for mounting said drive member on one end of said shaft for rotative movement as a unit therewith but axial movement relative thereto, means formed on the other end of said shaft and engaging said gate to open the latter prior to engagement of said drive member with said driven member so that said gate is opened before the film is moved in said one direction by said sprocket, means cooperating with said shaft and drive member normally to retain said drive member in position to engage and rotate said driven member and sprocket when said drive member is rotated, said drive member being movable axially relative to said shaft to a retracted position, a wind-up spool to which said strip is connected, and means to rotate said spool to rotate said sprocket in the opposite direction to rewind said strip onto said spool.

8. In a strip film feeding apparatus, the combination with a film sprocket for feeding a film strip through an apertured film gate to frame an image area at the gate aperture, said gate comprising a pair of plate members which are spring pressed toward each other to clamp the strip therebetween and which are movable apart to permit the strip to be moved freely through said gate, a Geneva movement comprising a pin drive wheel and a slotted driven star wheel adapted to be engaged to and driven by said pin wheel during only a portion of the movement of the latter, of means for connecting said star wheel to said sprocket so that the latter is rotated in one direction when said star wheel is driven by said pin wheel to move the strip in one direction through said gate, a shaft, means for mounting said pin wheel on one end of said shaft for rotation as a unit therewith but for relative axial movement, a spring connecting said shaft and pin wheel to hold the latter axially on said shaft in position to engage and rotate said star wheel to impart rotation to said sprocket to move the strip through said gate, means formed on the other end of said shaft and positioned between said plate members and engaging said members upon rotation of said pin wheel to move said plate members apart to open said gate, said opening occurring prior to the engagement of said pin wheel with said star wheel so that said gate is opened before the film is moved by said sprocket, said pin wheel being movable axially relative to said shaft to a retracted position and away from and out of operative relation with said star wheel, means to limit the axial movement of said pin wheel relative to said shaft, said pin wheel then being rotated with said shaft to cause said gate opening means to engage and move said plate members apart to open said gate, means engaging said pin wheel to hold the latter in its retracted and gate opening position, a take-up spool to which said strip is connected, and means to rotate said spool to cause said sprocket to rotate to move said strip in the opposite direction through said gate for winding up on said spool.

References Cited in the file of this patent

UNITED STATES PATENTS

| | | |
|---|---|---|
| 743,419 | Armat | Nov. 10, 1903 |
| 929,743 | Wooden | Aug. 3, 1909 |
| 939,634 | Roebuck | Nov. 9, 1909 |
| 955,840 | Messter | Apr. 19, 1910 |
| 1,057,234 | Green | Mar. 25, 1913 |
| 1,201,727 | Headley | Oct. 17, 1916 |
| 1,450,514 | Perham | Apr. 3, 1923 |
| 1,624,669 | Lehwess | Apr. 12, 1927 |
| 1,704,814 | Wellman | Mar. 12, 1929 |
| 1,738,762 | De Vault | Dec. 10, 1929 |
| 1,771,509 | Ott | July 29, 1930 |
| 2,231,765 | Landrock | Feb. 11, 1941 |
| 2,425,704 | Nemeth | Aug. 12, 1947 |
| 2,478,679 | Bartelson | Aug. 9, 1949 |
| 2,457,913 | Nemeth | Jan. 4, 1949 |
| 2,516,979 | Gould et al. | Aug. 1, 1950 |
| 2,724,990 | Bennett | Nov. 29, 1955 |

FOREIGN PATENTS

| | | |
|---|---|---|
| 14,585 | Great Britain | 1914 |
| 588,932 | Great Britain | June 6, 1947 |